United States Patent
VanDenberg

[19]

[11] Patent Number: 5,845,919
[45] Date of Patent: Dec. 8, 1998

[54] SPRING BEAM SUSPENSION SYSTEM

[75] Inventor: Ervin K. VanDenberg, Massillon, Ohio

[73] Assignee: Meritor Heavy Vehicle Suspension Systems, Inc.

[21] Appl. No.: 705,758

[22] Filed: Aug. 30, 1996

[51] Int. Cl.[6] .................................................. B60G 11/18
[52] U.S. Cl. .............................. 280/124.175; 280/124.17
[58] Field of Search ................................. 280/720, 686, 280/683, 712, 124.17, 124.175

[56] References Cited

U.S. PATENT DOCUMENTS

| | | | |
|---|---|---|---|
| 3,103,350 | 9/1963 | Chosy | 267/52 |
| 3,108,822 | 10/1963 | Tantlinger et al. | 280/104.5 |
| 3,398,946 | 8/1968 | Mathers | 267/52 |
| 3,817,550 | 6/1974 | Young | 280/104.5 A |
| 3,850,445 | 11/1974 | Borns et al. | 280/124 F |
| 3,860,259 | 1/1975 | Allison et al. | 280/720 |
| 4,087,115 | 5/1978 | Earle | 280/720 |
| 4,162,090 | 7/1979 | Schwartz | 280/688 |
| 4,405,154 | 9/1983 | Masser | 280/686 |
| 4,504,080 | 3/1985 | VanDenberg | 280/704 |
| 4,553,773 | 11/1985 | Pierce | 280/676 |
| 4,693,486 | 9/1987 | Pierce et al. | 280/80 R |
| 4,871,188 | 10/1989 | Baxter | 280/686 |
| 4,889,361 | 12/1989 | Booher | 280/720 |
| 4,946,190 | 8/1990 | Buttner | 280/712 |
| 5,058,917 | 10/1991 | Richardson | 280/704 |
| 5,116,075 | 5/1992 | Pierce | 280/688 |
| 5,201,898 | 4/1993 | Pierce | 280/68 |
| 5,332,258 | 7/1994 | Buttner | 280/704 |
| 5,346,247 | 9/1994 | Snyder | 280/172 |
| 5,393,096 | 2/1995 | Pierce et al. | 280/788 |

OTHER PUBLICATIONS

Reyco RS1015/86AR Slider/Air Suspension Brochure, Jan. 1995.
86 AR Reyco/Transpro Air–Ride Suspension Slider System Brochure.
Road Air 2000 Brochure.
Reyco Transpro 86/88 High Quality Fabricated Trailer Suspension Brochure, Feb. 1995.

*Primary Examiner*—Kenneth R. Rice

[57] ABSTRACT

A suspension system includes a pair of spring beams with each spring beam pivotally mounted to a hanger bracket extending downwardly from a vehicle. An axle seat is mounted to an end of each spring beam and includes a passage extending therethrough. The spring beam passes through the passage formed in the axle seat and is permitted to deflect in response to vertical loads within the passage. A resilient bushing is positioned within the passage and intermediate the axle seat and the spring beam to permit the spring beam to assist in retaining the axle seat onto the beam, and to assure that the spring beam may flex along its entire length. The axle seat is retained on the spring beam by the pin connection extending through an eyelet formed in one end of the spring beam. In alternative embodiments, one end of the spring beam is movable relative to either the hanger bracket or the axle seat with the axle seat being retained on the spring beam by an adjustable link mounted via a pair of mounting pins to the hanger bracket or mounting hood and to the axle seat.

18 Claims, 5 Drawing Sheets

SPRING BEAM SUSPENSION SYSTEM

BACKGROUND OF THE INVENTION

1. Technical Field

The invention relates generally to an improved vehicle suspension system. More particularly, the invention relates to a spring beam type suspension system with an improved axle seat-to-beam connection. Specifically, the invention relates to a suspension system which more effectively utilizes the entire spring beam length.

2. Background Information

The trucking industry has witnessed a dramatic increase in the cost associated with transporting goods. Additionally, weight restrictions on over-the-road trucks have become increasingly stringent. These changes in the trucking industry pointed to a need for suspension systems that are lightweight and which safely support increasingly larger loads.

Suspension systems may take a variety of forms, including parallelogram suspensions, and leading and trailing beam type suspensions. Generally, leading and trailing beam type suspensions include a pair of longitudinally extending beams which may either be flexible or rigid, one of which is located adjacent each of two longitudinally extending frame rails located beneath the body of the truck or trailer. These beams are pivotally connected at one end to a hanger bracket extending downwardly from the frame, with an axle extending between the beams adjacent the other end. Additionally, an air or coil spring is generally positioned intermediate each frame rail and a corresponding beam. The beam may extend forwardly or rearwardly of the pivot, thus defining a leading or trailing beam respectively. Beam type suspension systems are used on a significant number of trucks and trailers, and must have sufficient strength to resist lateral and axial deflection while remaining stable. Lateral forces act on a suspension system in a variety of ways with the most common being that lateral forces act on a suspension as a vehicle negotiates a turn. As the vehicle turns, sheer stress acts between the tire and the road surface causing lateral force to be transferred through the tire wheel assembly to the axle. The axle, being rigidly attached to the suspension, transfers the lateral force into the beam causing it to deflect laterally. This lateral deflection can be extreme, and under certain loading conditions, can cause the tires to contact the vehicle frame rails.

Roll stability refers to the suspensions ability to provide counteracting forces operating on the end of an axle causing one end of the axle to raise relative to the frame a distance greater than the other end of the axle. Roll instability is encountered when the vehicle frame tilts or rolls excessively relative to the axle; for example, when the vehicle negotiates a turn such that the centrifugal and acceleration forces cause vehicle lean that reduces the downward forces acting on the inside wheel of the turn, and increases the downward force acting on the outside wheel of the turn such that the vehicle becomes uncontrollable or tips over. Roll flexibility is necessary when the axle moves relative to the frame; for example, during diagonal axle walk.

Diagonal axle walk occurs when the wheels at the opposite ends of the axle encounter unlike irregularities in a road or off-the-road surface, such as when one wheel rides over a curb. As the wheel rides over the curb, an upward force acts on that wheel, and a counteracting downward force acts on the wheel not riding over the curb. If the suspension is unable to provide flexibility between the axle and the frame as the tire-wheel assembly travels over the curb or ground irregularity, or alternatively to provide flexibility between the axle and the frame as the vehicle negotiates a turn, the suspension will be too roll rigid, and may over-stress vehicle components.

Roll rigid suspensions are used to stabilize high center of gravity vehicles such as highway trailers. In these application, only enough roll compliance is permitted to allow the axle suspension to negotiate uneven terrain without unduly stressing the vehicle frame or axle. Typically, the roll angles of the axle frame are limited to 2 to 3 degrees in roll rigid suspensions. That is, if all the load were transferred to the tire or tires on one side of the vehicle and the tire or tires on the other side of the vehicle are completely off the ground, the angle of the axle relative to the frame reaches only about 2 to 3 degrees for a typical roll rigid suspension.

Conversely, roll flexible suspensions are used on low height vehicles and some axles of multi-axle vehicles which are stabilized with other suspensions. In these situations, the flexible suspensions operate to merely increase the load carrying capacity of the truck. In these application, tractive effort is paramount as a flexible suspension allows the tires to remain in contact with the ground. The tires must remain in contact to assure that the increased carrying capacity of the vehicle is evenly transmitted through the frame to the ground without inducing undue stress to the vehicle frame structure. Regardless of whether a roll rigid or roll flexible suspension is utilized, the suspension must be roll stable and provide the proper roll and lateral control needed to assure that the total vehicle is stable.

Typical truck and trailer air suspensions often employ a rigid beam with a resilient axle-to-beam connection, a flexible or spring beam with a rigid axle-to-beam connection or a rigid beam with a rigid axle to beam connection with a tri-functional front pivot connection. Either the beam or the axle-to-beam connection must be rigid in order to successfully take up vertical forces experienced during vehicle operation. As spring beam designs typically include a rigid axle-to-beam connection, small rigid pivot bushings, large U-bolts and heavy clamping and mounting pins they tend to be substantially heavier than suspension systems using fabricated beams and resilient axle-to-beam connections or large resilient pivot connections.

Regardless of the size and shape of the spring beam utilized in the suspension system, the axle must necessarily be rigidly mounted to the spring beam in a manner which prevents the beam from flexing directly over the axle. Specifically, it is common to position rigid U-bolts on either side of the spring beam to clamp the beam to the axle. The spring beam is thus effectively transformed into a rigid beam adjacent the axle. The effective length of the spring beam is thus dramatically shortened as the use of the U-bolts adjacent the axle not only prevent the beam from operating as a spring adjacent the axle, but also the length of the beam positioned to the rear of the axle also does not offer roll stability to the vehicle. Inasmuch as the length of the beam is shortened, the cross-sectional area of the beam must also be reduced in order to maintain the required spring compliance. The reduction of the spring beam cross-sectional area, while permitting the vehicle to remain roll stable, significantly reduces spring beam strength and shorten the spring beam life span of the smaller spring beam.

Specifically, deflection is determined by the equation: deflection $=1/C \times pl^3/EI$ where C is a coefficient determined by the spring shape, E is the modulus of the elasticity, I is the moment of inertia, P is the load on the beam and L is the beam length. As can be seen, for a given material, the coefficient, modulus of elasticity and moment of inertia are linear variables, or variables which remain constant for a given material and spring, with the beam length significantly altering the available beam deflection given that L is cubed in the above referenced equation. The above equation thus indicates that a spring beam which has a longer effective length will provide a greater deflection for a given cross-sectional configuration and that the cross-sectional area of a spring with a longer effective length may be substantially increased in order to increase the springs resistance to both cyclic failure and distortion as a result of vehicle overload.

Referring again to the above equation, if a given spring beam is manufactured to be 25 inches long, and the axle is rigidly mounted via a plurality of U-bolts to the spring beam at a position along the beam 15 inches from the front pivot, the length of the beam has effectively been shortened from 25 inches to 15. In essence, $L^3$ is 3,375 $in^3$ in the above equation rather than 15,625 $in^3$. This dramatic decrease in the effective length of the spring beam assures that the spring beam must be manufactured of substantially smaller spring stock which substantially reduces the springs resistance to cyclic failure and distortion as a result of any overload. Alternatively, if the entire length of the spring beam were utilized, a beam having a significantly larger cross-section would be utilized substantially increasing the beams resistance to cyclic failure and distortion as a result of overload.

Utilizing the entire spring beam length is also beneficial in that the material out of which the spring beam is manufactured is significantly more expensive than rigid beam steel stock and it is not economically efficient to purchase material which is significantly more expensive, so that the material provides spring beam capability, and then effectively clamp the spring in such a manner that it is prevented from operating as a spring beam.

Additionally, each U-bolt which extends around a spring beam creates a stress riser point on either side thereof which further reduces the life span of the spring beam, and the U-bolt. Such stress risers can significantly reduce the life span of the beam and the U-bolt thus causing unwanted wear. As the beam and U-bolt wear at this location, it is also possible that the U-bolt will loosen relative to both the axle and the spring beam thereby creating a substantial safety hazard.

The need thus exists for a suspension system whereby the axle is mounted to the spring beam in such a manner that the full length of the spring beam is utilized whereby L in the equation $1/C \times pl^3/ei$ equals the entire length of the spring beam, and is not limited to the distance between the axle connection and the front pivot of the spring beam. Additionally, the need exists for a suspension system which is lightweight, and which permits the spring to deflect relative to the axle along its entire length.

SUMMARY OF THE INVENTION

Objectives of the invention include providing a vehicle suspension that is roll stable and resistant to lateral and longitudinal forces.

Another objective is to provide a vehicle suspension system utilizing a pair of spring beams which may deflect relative to the axle.

A further objective is to provide a vehicle suspension system where the axle mounting brackets are manufactured with a sleeve for receiving a spring beam, and the beam may deflect within the sleeve along its entire length.

A still further objective is to provide a vehicle suspension system in which a bushing is interposed between the interior of the axle sleeve and the spring beam.

Yet another objective is to provide a vehicle suspension system in which L in the deflection equation is equal to the spring beam length.

Still another objective is to provide a vehicle suspension system in which the spring beam may be manufactured of a material having a significantly larger cross-sectional area thereby reducing the spring beam susceptibility to cyclic failure and distortion as a result of vehicle overload.

Yet another objective is to provide such a vehicle suspension system which is of simple construction, which achieves the stated objectives in a simple, effective and inexpensive manner, and which solves problems and satisfies needs existing in the art.

Another objective of the invention is to provide a suspension system with no stress risers along the length of the spring beam.

These and other objectives and advantages of the invention are obtained by the improved vehicle suspension system, the general nature of which may be stated as including a pair of spaced apart beams having a first end and a second end whereby each beam is a spring beam; an axle; a pair of axle seats mounted to the axle adjacent each spring beam; and a passage extending at least partially through each axle seat for receiving a portion of the spring beams whereby the spring beams may deflect within the associated passage.

BRIEF DESCRIPTION OF THE DRAWINGS

The preferred embodiments of the invention, illustrative of the best modes in which the applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
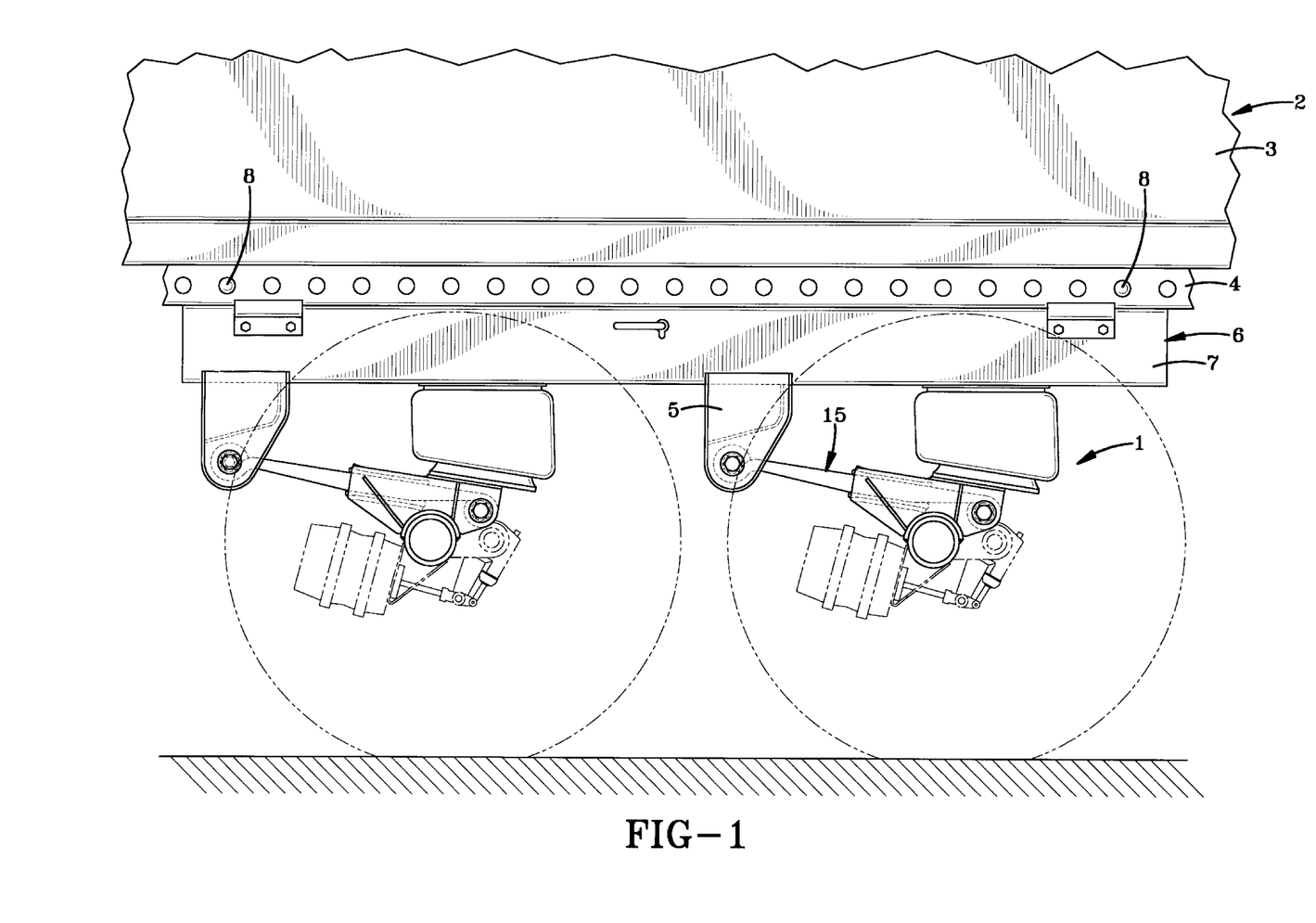
FIG. 1 is a side elevational view of a pair of suspension systems with the tire and brake assemblies shown in dot-dash lines, and shown attached to a vehicle.

The improved vehicle suspension system of the present invention is indicated generally at 1, and is particularly shown in FIG. 1 mounted on a vehicle 2, such as a truck or trailer. Vehicle 2 includes a cargo box 3 supported by a pair of frame rails 4 extending longitudinally beneath cargo box 3 and along the length of vehicle 2. Suspension system 1 includes a pair of hanger brackets 5 welded to a slider frame 6, which includes a pair of parallel and spaced apart slide channels 7. Slide channels 7 are spaced apart a distance equal to the distance of frame rails 4 and are mounted to frame rails 4 with a plurality of locking pins 8. Referring to FIG. 1, a pair of identical suspension systems 1 are shown installed on vehicle 2, with only one being described in detail below.

Figure 2:
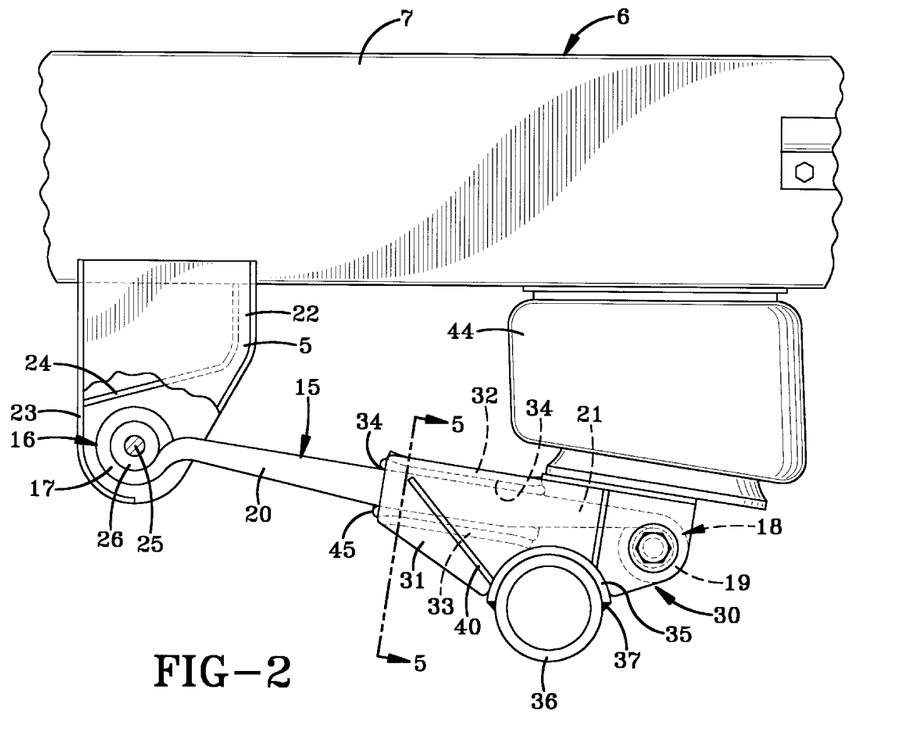
FIG. 2 is an enlarged side elevational view of one of the vehicle suspension systems shown in FIG. 1 with portions cut away.
Figure 3:
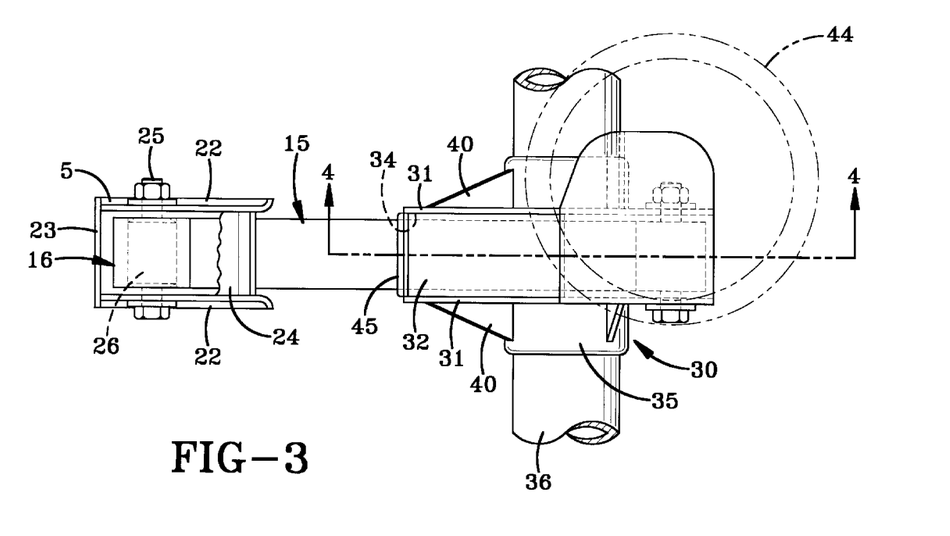
FIG. 3 is a top plan view with portions cut away and with the air spring shown in dot-dash lines.

Suspension system 1 includes a pair of parallel and spaced apart trailing spring beams 15 (FIGS. 2–3). Inasmuch as trailing spring beams 15 are identical, only one will be described in detail. The first end 16 of each trailing beam 15 is formed with a circular eyelet 17 with the second end 18 of spring beam 15 being formed with a circular eyelet 19. Spring beams 15 may take a variety of sizes and configurations, but in the preferred embodiment each spring beam includes a tapered section 20 having the smallest cross-sectional area adjacent the first end and the largest cross-sectional area intermediate first end 16 and second end 18. A second tapered section 21 tapers from a small cross-sectional area adjacent second end 18 to a center section intermediate first end 16 and second end 18. While spring beam 15 may be manufactured from a variety of materials, it is preferably manufactured from a material having a modulus of elasticity in the range of from $4\times10^6$ PSI to $30\times10^6$ PSI.

Hanger bracket 5 includes a pair of parallel and spaced apart sidewalls 22, and an arcuate rear wall 23. Additionally, a strengthening gusset 24 is positioned intermediate sidewalls 22. Sidewalls 22 of hanger bracket 5 are each formed with axially aligned holes for receiving a mounting pin 25. A bushing 26 is positioned around mounting pin 25 and intermediate mounting pin 25 and eyelet 17. Mounting pin 25 thus securely retains spring beam 15 intermediate sidewalls 22 of hanger bracket 5 and permits rotational movement therearound.

In accordance with one of the main features of the present invention, an axle seat 30 is formed with a pair of parallel and spaced apart sidewalls 31, a top wall 32 and a bottom wall 33 spaced apart from top wall 32. As shown specifically in FIGS. 2, 4 and 5, sidewalls 31 are spaced apart a distance greater than the width of spring beam 15, and top wall 32 and bottom wall 33 are spaced apart a distance greater than the height of spring beam 15. In accordance with one of the main features of the present invention, sidewalls 31, top wall 32 and bottom wall 33 thus define a passage 34 for receiving spring beam 15.

Figure 4:
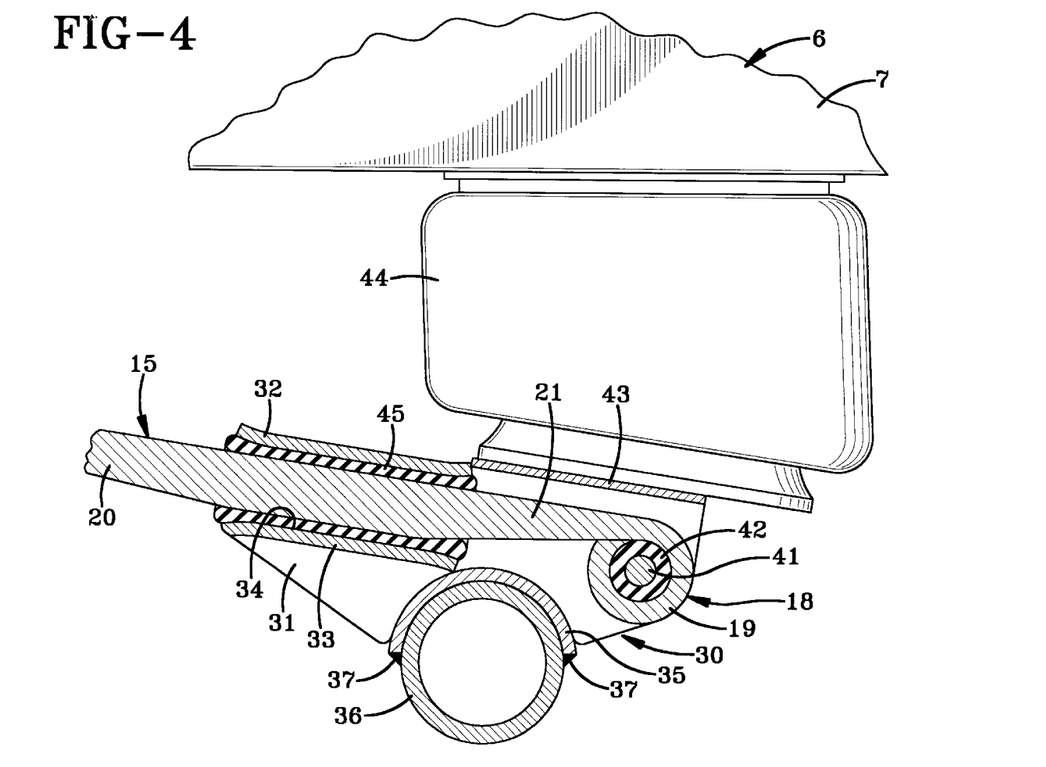
FIG. 4 is a sectional view taken along line 4—4, FIG. 3.
Figure 5:
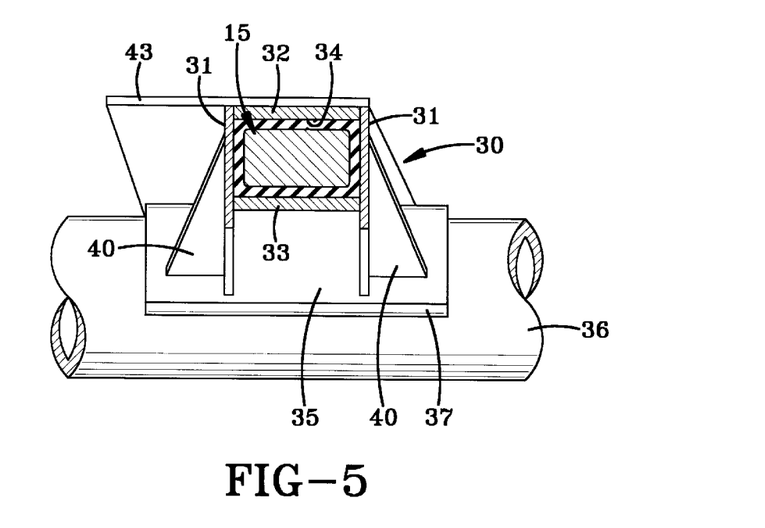
FIG. 5 is a sectional view taken along line 5—5, FIG. 2.

A semi-circular axle flange 35 is mounted adjacent bottom wall 33 and securely welded to sidewalls 31. Axle flange 35 is complementary shaped to the top surface of an axle 36 and is welded thereto via a plurality of welds 37 extending longitudinally along axle 36. As axle flange 35 extends outwardly beyond sidewalls 31, a strengthening gusset 40 extends between each sidewall 31 and axle flange 35 in order to assure that axle flange 35 remains securely welded to axle 36 and to prevent deflection thereof. Each sidewall 31 is formed with a hole for receiving a mounting pin 41 (FIG. 4). A bushing 42 is positioned around mounting pin 41 and intermediate mounting pin 41 and circular eyelet 19 formed on second end 18 of spring beam 15. In this manner, axle seat 30 is secured to spring beam 15. An air spring mounting plate 43 is welded to top wall 32 for receiving an air spring 44 mounted intermediate air spring mounting plate 43 and slider frame 6.

In accordance with one of the main features of the present invention, a resilient bushing 45 is positioned within passage 34 and intermediate spring beam 15 and sidewalls 31, top wall 32 and bottom wall 33 of axle seat 30. While resilient bushings 45 may be manufactured from a variety of materials, it is preferably a resilient bushing having a durometer in the range of from 50 shore A to 95 shore A and is fitted under pressure within passage 34 and around spring beam 15.

In operation, axle seat 30 is securely mounted to spring beam 15 through a mounting pin 41 while simultaneously assuring that the length of spring beam 15 from first end 16 to second end 18 may react to vertical load by flexing along its entire length. Specifically, as vertical load is imparted to each spring beam 15, for example when the vehicle negotiates a turn, or when the tire wheel assemblies on axle 36 encounter unlike ground irregularities, each trailing beam 15 will flex along its length which flexure is permitted as resilient bushing 45 merely engages spring beam 15, but permits the same to flex within passage 34 formed in axle seat 30. Given that resilient bushing 45 within passage 34 of axle seat 30 permits spring beam 15 to flex along its entire length between first end 16 and second end 18, spring beam 15 may be manufactured of thicker material while providing the same rate of deflection in accordance with the equation $1/C\times pl^3/ei$. The larger cross-sectional area of spring beam 15 thus assures that spring beam 15 will be less likely to fracture as a result of cyclic stress, and will be less likely to deform as a result of vehicle overload. Additionally, flexure along the entire length of spring beam 15 assures that each individual unit length of spring beam 15 will be required to deflect less than a prior art spring beam which rigidly secured the axle via a plurality of U-bolts positioned intermediate the ends of spring beam 15.

For example, each inch of a thirty inch spring beam is required to deflect $\frac{1}{30}$ of an inch for each one inch of vertical deflection. Conversely, a spring beam which has been effectively shortened by incapacitating a portion of the beam will be required to deflect a larger distance. Specifically, if an axle is mounted ten inches from the end of a thirty inch beam, the spring beam must deflect $\frac{1}{20}$ of an inch, rather than $\frac{1}{30}$ of an inch for each inch of vertical deflection thereby significantly increasing the spring beam strain per unit length.

Figure 6:
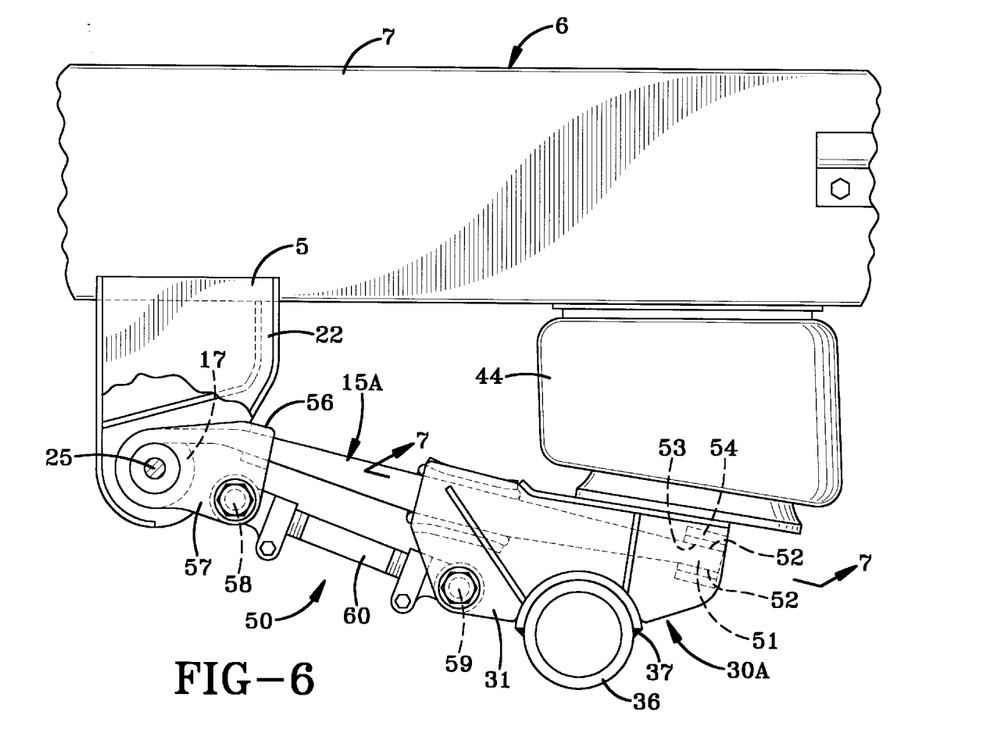
FIG. 6 is a side elevational view of a second embodiment of the vehicle suspension system of the present invention with portions cut away.
Figure 7:
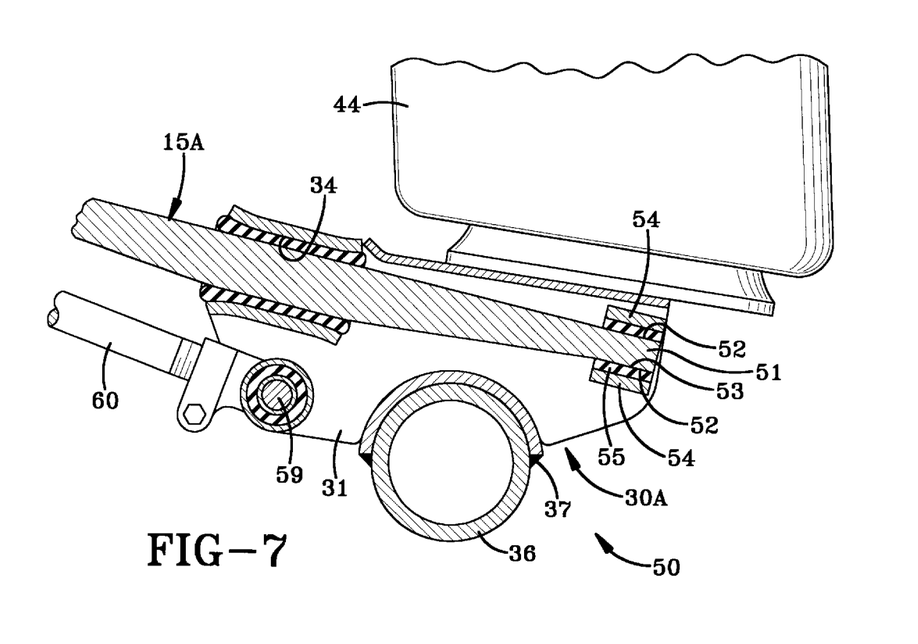
FIG. 7 is a sectional view taken along line 7—7, FIG. 6.

The second embodiment of the present invention is indicated generally at 50 and as shown particularly in FIGS. 6 and 7. Suspension system 50 is similar to suspension system 1 in that it includes a vehicle 2, a pair of hanger brackets 5, an axle 36, and a spring beam 15A having a circular eyelet 17 mounted on a mounting pin 25. However, suspension system 50 differs from suspension system 1 in that spring beam 15A includes a second end 51 having a pair of parallel and spaced apart faces 52 (FIG. 7). A second passage 53 is also provided. Specifically, a pair of parallel and spaced apart stop walls 54 are positioned intermediate sidewalls 31 of an axle seat 30A. Second passage 53 extends intermediate stop walls 54 and sidewalls 31 which form second passage 53 and a second bushing 55 is positioned within second passage 53 and intermediate stop walls 54 and sidewalls 31. Spring beam 15 thus extends through passage 34 and second passage 53.

Additionally, a mounting hood 56 extends over first end 16 of spring beam 15 and is retained in position intermediate sidewalls 22 of hanger bracket 5. Mounting hood 56 includes a plurality of parallel and spaced apart sidewalls 57. Each sidewall 57 is formed with a hole for receiving a mounting pin 58. Similarly, sidewalls 31 of axle seat 30A are formed with axially aligned holes for receiving a mounting pin 59. An adjustable link 60 is mounted intermediate mounting pins 58 and 59 and securely retains axle seat 30A to trailing beam 15. Additionally, adjustable link 60 permits axle 36 to be accurately adjusted such that it may be moved to a position substantially perpendicular to the direction of travel of vehicle 2. As with suspension system 1, spring beam 15A of suspension system 50 is permitted to deflect along its entire length substantially decreasing the deflection per unit length of spring beam 15.

Figure 8:
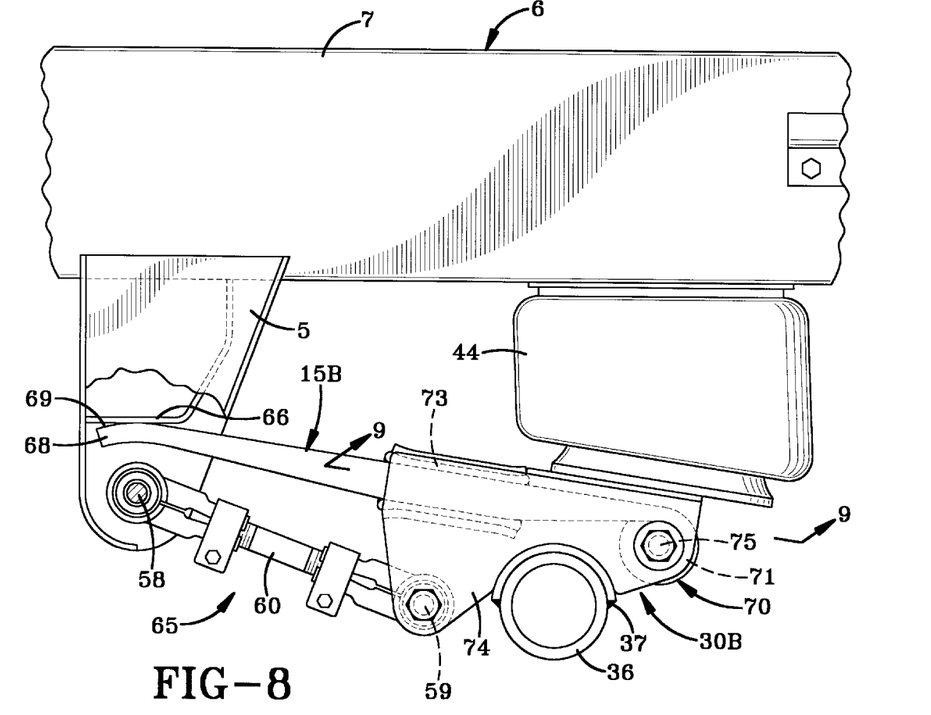
FIG. 8 is a side elevational view of a third embodiment of the present invention with portions cut away.
Figure 9:
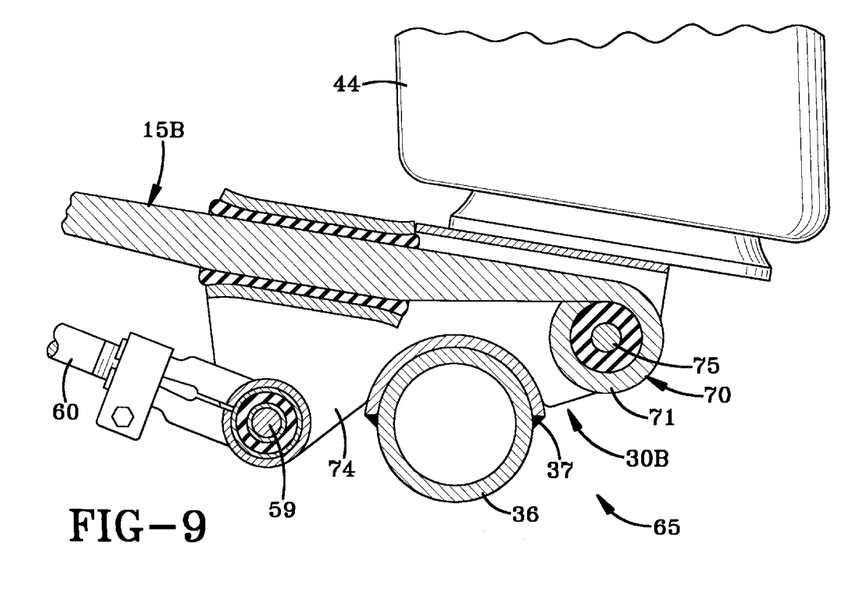
FIG. 9 is a sectional view taken along line 9—9, FIG. 8.

The third embodiment of the invention is indicated generally at 65 and is shown specifically in FIGS. 8–9. Suspension system 65 is similar to suspension system 50 in that it includes a vehicle 2 and a pair of hanger brackets 5, an axle 36 and an adjustable link 60 mounted on a pair of mounting pins 58 and 59 and an air spring 44. However, suspension system 65 differs from suspension system 50 and suspension system 1 in that a wear plate 66 is positioned intermediate sidewalls 22 of each hanger bracket 5. Suspension system 65 also includes a spring beam 15B having a first end 68 formed with a camming surface 69 thereon. Spring beam 15B also includes a second end 70 having an eyelet 71 similar to eyelet 19 of suspension system 1 formed thereon. Suspension system 65 also includes an axle seat 30B having a pair of sidewalls 74. A mounting pin 75 extends through eyelet 71 and securely mounts spring beam 15B to axle seat 30B with adjustable link 60 securing axle seat 30B to hanger bracket 5. Camming surface 69 formed on first end 68 of spring beam 15B engages wear plate 66 and provides a constant pressure thereon.

Operationally, spring beam 67 will deflect along its entire length when vehicle 2 is loaded with longitudinal movement being restricted with the adjustable link 60 preventing longitudinal movement.

In summary, suspension systems 1, 50 and 65 permit the entire length of the associated spring beam to be utilized while assuring that the axle is restrained against longitudinal movement relative to hanger bracket 5. By permitting the entire length of the spring beam to be utilized, substantially thicker spring stock may be utilized thereby increasing the spring beams resistance to cyclic failure and to failure as a result of vehicle overload. Additionally, the suspension system which utilizes the entire length of the spring beam assures that each unit length of the spring beam endures a smaller deflection for any given vertical beam deflection.

Accordingly, the improved spring beam suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved spring beam suspension system is constructed and used, the characteristics of the construction, and the advantageous, new and useful results obtained; the new and useful structures, devices, elements, arrangements, parts and combinations, are set forth in the appended claims.

I claim:

1. A suspension system for use with a vehicle having a frame, the suspension system comprising:

a pair of spaced apart beams having a first end and a second end whereby each beam is a spring beam;

an axle;

an air spring adapted to be positioned intermediate the frame and the spring beam;

a pair of axle seats mounted to the axle adjacent each spring beam; and a passage extending entirely through each axle seat for receiving a portion of the spring beams such that the spring beam extends through the passage whereby the spring beams may deflect within the associated passage.

2. A suspension system as defined in claim 1 in which the passages are positioned above the axle within the axle seat.

3. A suspension system as defined in claim 1 in which the passages extend through the axle seats.

4. A suspension system as defined in claim 1 in which each axle seat surrounds the associated spring beam on four sides.

5. A suspension system as defined in claim 1 in which each passage is complementary shaped to the associated spring beam.

6. A suspension system for use with a vehicle having a frame, the suspension system comprising:

a pair of spaced apart beams having a first end and a second end whereby each beam is a spring beam;

an axle;

an air spring adapted to be positioned intermediate the frame and the spring beam;

a pair of axle seats mounted to the axle adjacent each spring beam;

a passage extending entirely through each axle seat for receiving a portion of the spring beams such that the spring beam extends through the passage whereby the spring beams may deflect within the associated passage; and a hanger bracket positioned adjacent each spring beam; and a mounting means for mounting each spring beam to one of the axle seats and hanger brackets is positioned adjacent one end of each spring beam.

7. A suspension system as defined in claim 6 in which the mounting means includes a mounting pin; in which at least one of the first and second ends of each spring beam include an eyelet formed therein; and in which the mounting pin extends through the eyelet.

8. A suspension system as defined in claim 7 in which a bushing is positioned intermediate each spring beam eyelet and the mounting pin.

9. A suspension system as defined in claim 6 in which the mounting means is positioned adjacent the one end and of each spring beam.

10. A suspension system as defined in claim 7 in which the mounting pins are mounted to the hanger brackets; and in which the first end of the spring beams slidingly engages the axle seats.

11. A suspension system as defined in claim 10 in which an adjustable link extends intermediate each hanger bracket and axle seat.

12. A suspension system as defined in claim 7 in which the mounting pins are mounted to the axle seats; and in which the second end of the spring beams slidingly engages the hanger bracket.

13. A suspension system as defined in claim 12 in which an adjustable link extends between each hanger bracket and axle seat.

14. A suspension system for use with a vehicle having a frame, the suspension system comprising:
- a pair of spaced apart beams having a first end and a second end whereby each beam is a spring beam;
- an axle;
- an air spring adapted to be positioned intermediate the frame and the spring beam;
- a pair of axle seats mounted to the axle adjacent each spring beam;
- a passage extending entirely through each axle seat for receiving a portion of the spring beams such that the spring beam extends through the passage whereby the spring beams may deflect within the associated passage; and
- a bushing positioned within each passage and adjacent a portion of the associated spring beam to permit movement of the beam within the passage.

15. A suspension system as defined in claim 14 in which the bushing positioned within the passage is a resilient bushing.

16. A suspension system as defined in claim 15 in which each beam has a length, and in which each bushing surrounds the associated beam along a portion of its length.

17. A suspension system as defined in claim 16 in which each bushing is fitted intermediate each axle seat and spring beam.

18. A suspension system as defined in claim 14 in which the spring beam has an effective length, and in which the length of the spring beam in the equation $pl^3/ei$ is the full length of the spring beam.

* * * * *